United States Patent

Spencer et al.

[11] Patent Number: 5,229,880
[45] Date of Patent: Jul. 20, 1993

[54] THREE FIELD OF VIEW REFRACTIVE AFOCAL TELESCOPE

[75] Inventors: Harvey M. Spencer, Torrance; Lacy G. Cook, El Segundo, both of Calif.

[73] Assignee: Hughes Aircraft Company, Los Angeles, Calif.

[21] Appl. No.: 848,632

[22] Filed: Mar. 9, 1992

[51] Int. Cl.⁵ .......... G02B 5/18; G02B 13/14; G02B 15/02
[52] U.S. Cl. .......... 359/353; 359/357; 359/566; 359/674
[58] Field of Search ........ 359/350, 351, 353, 354, 359/355, 356, 357, 566, 672, 674

[56] References Cited

U.S. PATENT DOCUMENTS

| | | | |
|---|---|---|---|
| 3,363,964 | 1/1968 | Macher | 359/674 |
| 4,240,697 | 12/1980 | Takano et al. | 359/674 |
| 4,427,268 | 1/1984 | Ikemori | 359/674 |
| 4,466,707 | 8/1984 | Ikemori et al. | 359/674 |
| 4,469,396 | 9/1984 | Neil | 359/353 |
| 4,486,069 | 12/1984 | Neil et al. | 359/353 |
| 4,695,119 | 9/1987 | Neil | 359/353 |
| 4,877,315 | 10/1989 | Bradford | 359/356 |
| 4,988,173 | 1/1991 | Margolis | 359/674 |
| 4,989,962 | 2/1991 | Kebo | 359/354 |
| 5,044,706 | 9/1991 | Chen | 359/357 |

Primary Examiner—Martin Lerner
Attorney, Agent, or Firm—Michael W. Sales; Wanda K. Denson-Low

[57] ABSTRACT

An infrared refractive reimaging afocal telescope (10) has an objective lens group (12), an eyepiece lens group (14), and a switching lens group (16). The system (10) provides a plurality of magnification modes in a compact arrangement. The system (10) utilizes lenses (40, 42, 44, 46) with diffractive surfaces to provide for magnification changes and chromatic aberration correction. The system provides for excellent image quality in all modes using a minimum number of lens elements.

9 Claims, 3 Drawing Sheets

THREE FIELD OF VIEW REFRACTIVE AFOCAL TELESCOPE

BACKGROUND OF THE INVENTION

1. Field of the Invention

The present invention relates to afocal telescopes and, more particularly, to a three coaxial field of view infrared refractive afocal telescope with at least one diffractive optical element.

2. Description of Related Art

When viewing a distant object through a telescope system, the observer is commonly interested in performing several separate functions. One of these functions may be a coarse search over a large field of view for the purpose of locating or acquiring previously undetected objects. Another function may be the fine examination over a smaller field of view for purposes of identification, tracking, or discrimination of previously located objects. Still a third such function may provide a very wide field of view for purposes of pilotage, navigation, or driving. Combining these three functions in a scanning forward looking infrared (FLIR) system usually requires three different afocal magnification telescopes employed in front of a common scanner, imager, and detector/dewar assembly. In applications requiring high resolution (e.g. for target identification and tracking), a high magnification afocal telescope is desirable. This is due to the large entrance aperture required to reduce diffraction effects in the infrared bands, where such effects contribute significantly to the optical blur, to a sufficiently low level to allow observation of target details. For applications requiring very wide fields of view (e.g. for pilotage or navigation), a magnification near or less than unity is desirable. Also, it is advantageous and desirable, when the ratio between the high and low magnification is very large to provide a third afocal magnification between the two extremes to bridge the gap and make target acquisition, observation, and hand-off between the high and low magnifications less taxing to either a human observer or an automated sensing algorithm.

Current refractive telescope systems have been utilized in whole or part. These refractive optical systems generally have one or more of the following disadvantages:

a) they may allow only two of the three magnification/field of view modes described above;

b) they often do not allow a sufficiently high magnification in the narrow field of view mode;

c) they are often of undesirably large size;

d) they are composed of a prohibitively large number of optical lens elements, such that the overall transmission is significantly lowered;

e) there is an incomplete correction of optical aberrations, most notably chromatic aberrations;

f) the multiple fields of view are not co-axial and cannot pass through a common external port or window;

g) they may leave unacceptably high narcissus levels whereby the detector can view itself by means of reflections from lens surfaces.

SUMMARY OF THE INVENTION

Accordingly, the new and improved refractive afocal telescope optical system of the present invention provides the art with improved aberration correction and reduction utilizing a minimum number of optical lens elements. The present invention also provides three coaxial fields of view in the thermal infrared band. The present invention further provides a system which enables packaging within a relatively small diameter spherical volume which leaves sufficient room for other required system elements such as scanners, imagers, detectors, gimbals, electronic cards or the like. The present invention also provides afocal magnifications greater than those previously available in the art.

In the preferred embodiment of the invention, the infrared refractive reimaging afocal telescopic system includes an objective lens group containing an entrance pupil for receiving and focusing radiation of a viewed object. An eyepiece lens group receives radiation from the objective lens group and recollimates the radiation and forms an exit pupil. A switching lens group, which is selectively positioned into and out of the radiation beam with respect to the objective lens group, receives energy to change the magnification and field of view of the telescope. The switching lens group has at least one optical element with a diffractive surface to correct chromatic aberration.

Generally, the switching lens group includes four lenses grouped in two pairs. A first pair of the lenses is positioned into the radiation beam to receive energy to provide a desired magnification and field of view. A second pair of lenses may also be positioned into the radiation beam, while the first pair is withdrawn from the beam, to receive energy to provide another desired magnification and field of view.

From the subsequent description and the appended claims taken in conjunction with the accompanying drawings, other objectives and advantages of the present invention will become apparent to those skilled in the art.

DESCRIPTION OF THE PREFERRED EMBODIMENT

Figure 1:
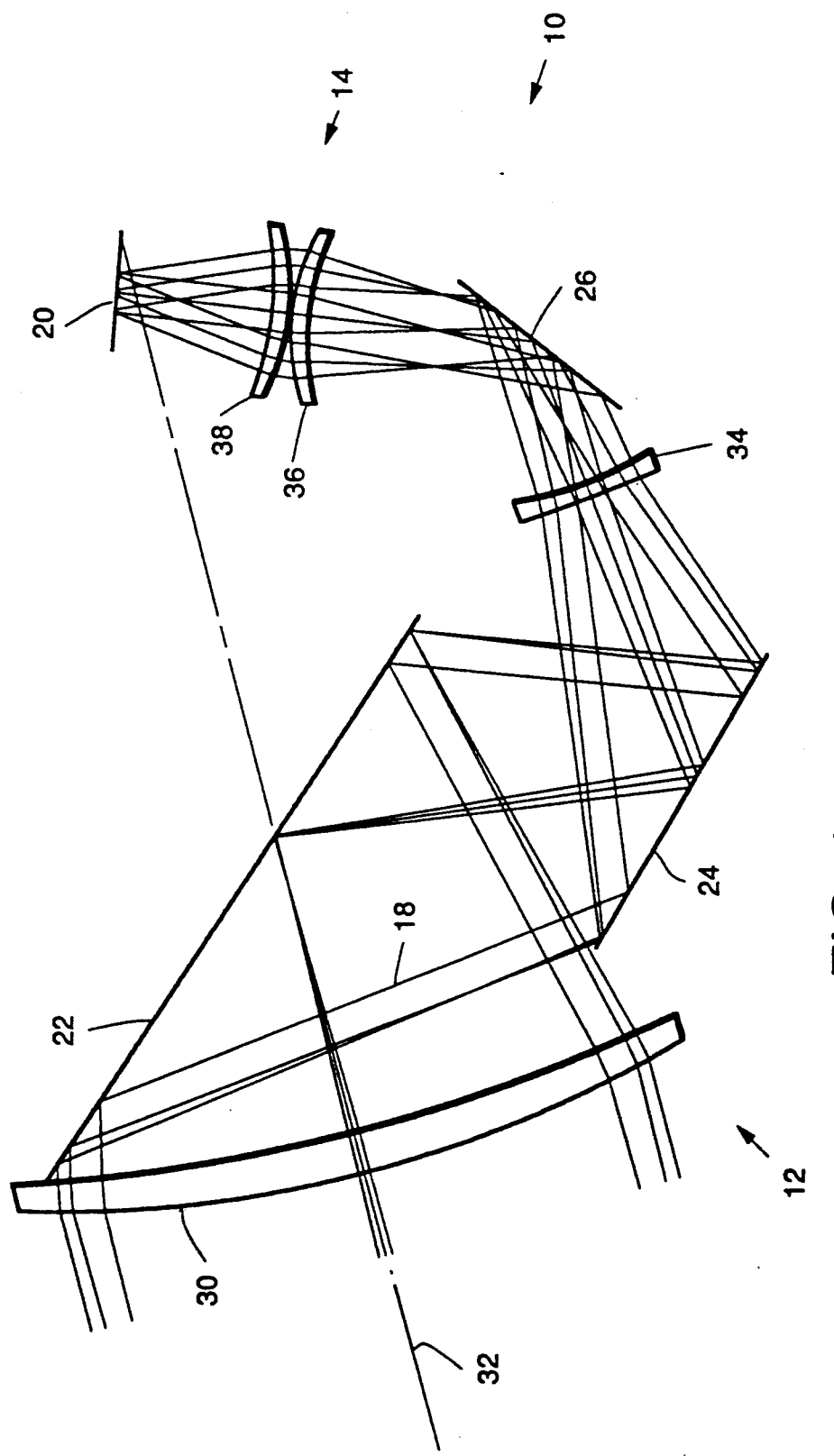
FIG. 1 is a schematic view of a first position of the optical system in accordance with the present invention with the switching lens pairs entirely out of the optical beam for obtaining the highest magnification telescope.
Figure 2:
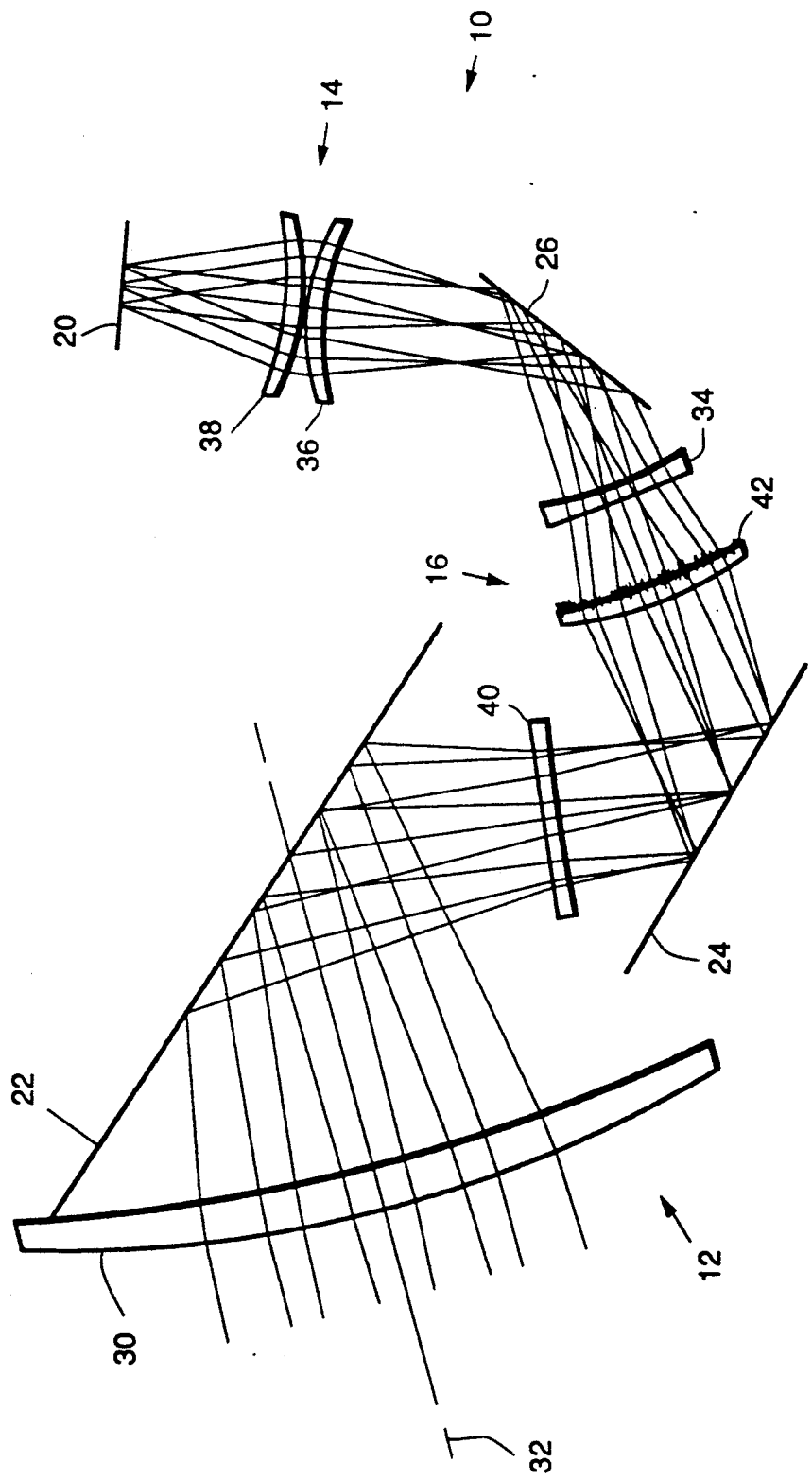
FIG. 2 is a schematic view of the present invention with a first pair of switching lenses in the optical beam for obtaining the intermediate magnification telescope.
Figure 3:
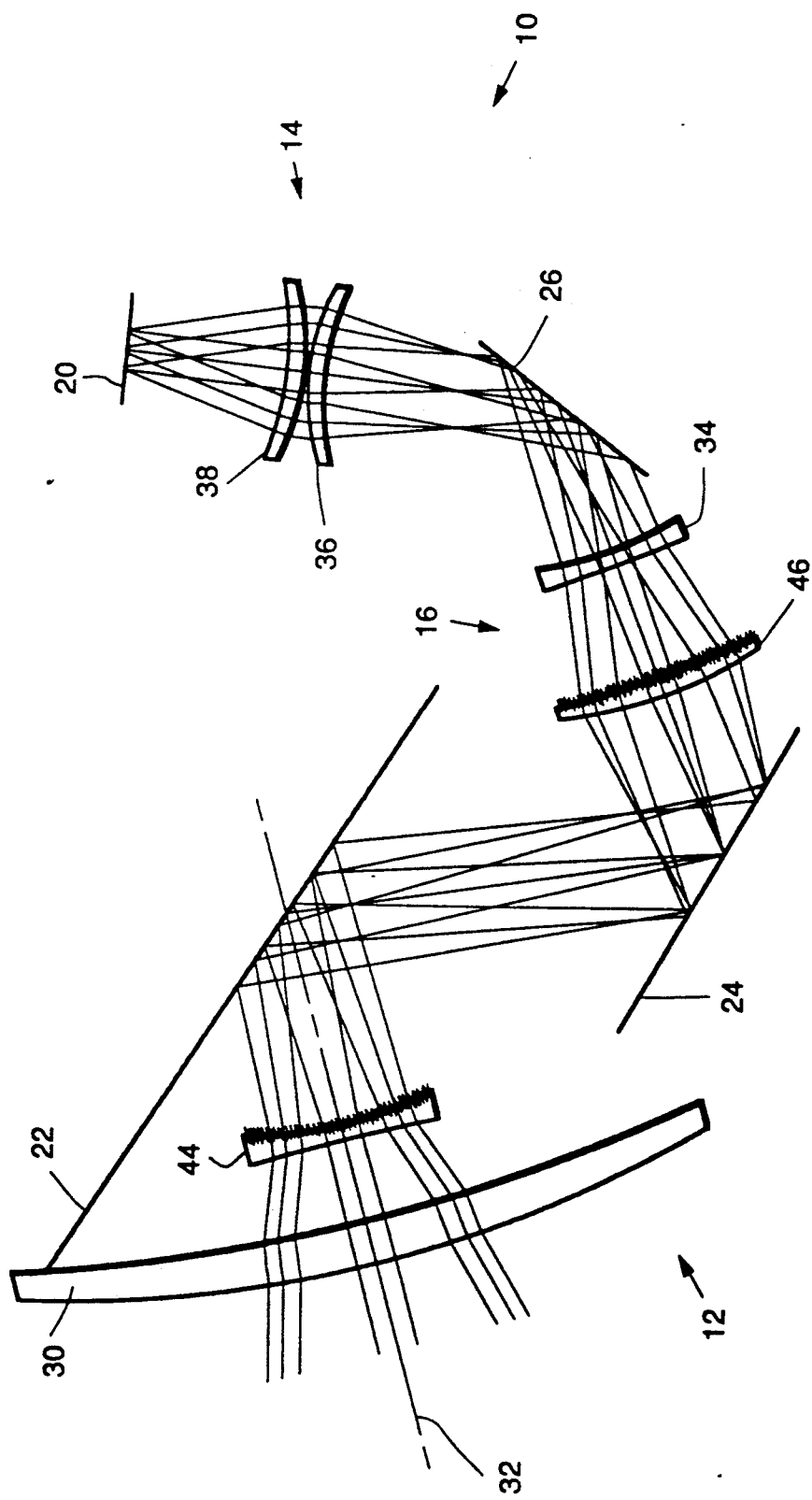
FIG. 3 is a schematic view like that of FIG. 2 with a second pair of switching lenses in the optical beam for obtaining the lowest magnification telescope; the first pair of switching lenses having been withdrawn from the optical beam.

Turning to FIGS. 1 through 3, an infrared refractive reimaging afocal telescopic system is illustrated and designated with the reference numeral 10. The system 10 includes an objective lens group 12, a eyepiece lens group 14, and switching lens group 16. The lens groups focus and then recollimate the beam 18 and form an exit pupil at plane 20. Also, fold mirrors 22, 24 and 26 act to fold the beam to provide a compact system. Subsequent in the optical path to exit pupil 20, is located the scanner, imager, and detector/dewar assemblies that are common elements in scanning infrared imaging systems.

The objective lens group 12 includes two lenses. The lens 30 defines an optical axis 32 and is preferably a positive convex/concave lens. The lens 34 is positioned on axis and is a negative biconcave lens. Both lenses have a predetermined radius of curvature on their front and back surfaces, a predetermined thickness at their vertexes and predetermined aperture sizes on their front and back surfaces. Also, the objective lenses are stationarily positioned with respect to the system 10.

The eyepiece lens group 14 includes a pair of lenses 36 and 38. Lens 36 is generally a positive concave/convex lens having a diffractive surface on the concave surface. The lens 38 is a positive convex/concave lens. The two eyepiece lenses recollimate the radiation focused by the objective lenses and reimage the entrance pupil to an exit pupil at 20. The diffractive surface enables chromatic dispersion in the thermal infrared spectral band to be controlled in such a way as to correct for lateral chromatic aberration inherently present in a simplified eyepiece of this type. This eliminates the cost, size, and weight of a more complex conventional eyepiece design. Also, the eyepiece lenses are stationarily positioned with respect to the system 10.

The switching lens group 16 is best illustrated in FIGS. 2 and 3. In FIG. 2, an intermediate magnification mode is illustrated. In FIG. 3, a wide field of view is illustrated.

The switching lens group 16 includes four lenses 40, 42, 44 and 46. The lenses 40 and 42, and 44 and 46 act as lens pairs in the intermediate and wide field of view magnification modes, respectively. The lens pair 40 and 42 is selectively moved in line with the beam 18 to receive radiation from the objective lens 30. The lens 40 is a negative biconcave lens positioned between fold mirrors 22 and 24. The lens 42 is a positive convex/concave lens having a diffractive surface on the concave side. Lens 42 is positioned between fold mirror 24 and the second lens 34 of the objective group. The lenses 40 and 42 are positioned on axis and have a predetermined radius of curvature on their front and back surfaces. Also, the lenses 40 and 42 have a predetermined thickness at their vertex and a predetermined aperture size on their front and back surfaces.

FIG. 3 illustrates a wide field of view magnification mode. In this case, lenses 40 and 42 have been rotated out of the beam 18 of the system. Lenses 44 and 46 are rotated into the beam 18 as seen in FIG. 3. The lens 44 is a negative plano/concave lens having a diffractive surface on the concave side. The lens 44 is positioned between the objective lens 30 and the first fold mirror 22. Also, the lens 44 is positioned on the optical axis 32.

The lens 46 is a positive convex/concave lens having a diffractive surface on its concave surface. The lens 46 is positioned between the fold mirror 24 and the objective lens 34. The lenses 44 and 46 have a predetermined radius of curvature on their front and back surfaces. Also, the lenses have a predetermined thickness at their vertex and predetermined aperture sizes on their front and back surfaces.

The diffractive optical surfaces may be binary optical elements which are generally produced through photolithographic processes or they may be true Fresnel phase plates produced by precision diamond machining. Generally, to generate optical power, the binary refractive optical element is in the form of a Fresnel phase plate with stair step approximations to the true desired periodic phase altering projections. Further details about binary optical surfaces may be found in the publications: G. Swanson and W. Veldkamp, "Infrared Applications Of Diffractive Optical Elements", SPIE Proceedings, Volume 885, Paper No. 22, 1988. This article is herein incorporated by reference.

Also, a diffractive surface may be formed by precision diamond machining. In this type of diffractive surface, the surface of the projections are a smoother approximation of the desired Fresnel phase screen, unlike the stair step projections of the photolithographic surfaces.

The switching lenses 40 through 46, in the grouping as described above, have the effect of reducing the focal length of the objective lens group while maintaining its focal plane at the same location as in the narrow field of view magnification mode as seen in FIG. 1. This allows the field of view of the telescope to become larger as the lens pairs are moved in and out of the beam. Thus, the same eyepiece recollimates the radiation without the need for repositioning with each magnification change.

The present invention in FIG. 1 provides for a 16× magnification narrow field of view embodiment. As the switching lens pair 40 and 42 are moved in the beam, the magnification is 6× with an intermediate field of view. The lens pair 44 and 46 provide a 1× magnification wide field of view. The system has a single diffractive surface in the narrow field of view magnification mode, a pair of diffractive surfaces in the intermediate field of view, and three diffractive surfaces in the wide field of view.

A specific prescription for telescopic system configuration is given in the following table.

TABLE 1

| Element Number | Designation | Radius | Thickness | Material | Conic Constant | Grating Coefficient* | Grating Order |
|---|---|---|---|---|---|---|---|
| 30 | Lens | 14.484 | 0.500 | Ge | — | — | — |
|  |  | 21.397 | 0.947 | Air | 0.26954 | — | — |
| 44 | Lens | −28.330 | 0.175 | ZnSe | — | — | — |
|  |  | 4.501 | 2.484 | Air | 1.5519 | 0.020406 | −1 |
| 22 | Fold Mirror | ∞ | −2.893 | Refl | — | — | — |
| 40 | Lens | −262.05 | −0.175 | Ge | — | — | — |
|  |  | −19.459 | −1.966 | Air | — | — | — |
| 24 | Fold Mirror | ∞ | 1.916 | Refl | — | — | — |
| 46 | Lens | 4.904 | 0.225 | Ge | −0.66966 | 0.157867 | −1 |
|  |  | 13.944 | 0.122 | Air | — | — | — |
| 42 | Lens | 4.284 | 0.225 | Ge | −0.14184 | 0.11528 | −1 |
|  |  | 8.694 | 0.991 | Air | — | — | — |
| 34 | Lens | 22.574 | 0.175 | ZnSe | — | — | — |
|  |  | 4.053 | 1.768 | Air | — | — | — |
| 26 | Fold Mirror | ∞ | −2.654 | Refl | — | — | — |
| 36 | Lens | 2.965 | −0.200 | Ge | 0.08718 | 0.053530 | +1 |
|  |  | 2.434 | −0.040 | Air | — | — | — |
| 38 | Lens | −2.709 | −0.200 | Ge | — | — | — |
|  |  | −3.541 | −1.850 | Air | — | — | — |

TABLE 1-continued

| Element Number | Designation | Radius | Optical Prescription | | Conic Constant | Grating Coefficient* | Grating Order |
| --- | --- | --- | --- | --- | --- | --- | --- |
| | | | Thickness | Material | | | |
| 20 | Exit Pupil | ∞ | | | | | |

*Grating Spacing = $\dfrac{\text{Grating Coefficient}}{\rho}$ where $\rho = \sqrt{x^2 + y^2}$
all measurements are in inches
positive is to the right It should be noted that the above prescription is an example for illustrative purposes and should not be construed in any way to limit the present invention.

In the intermediate magnification mode, the switching group diffractive surface acts to correct axial chromatic aberration. In the wide field of view mode, the switching lens group diffractive surfaces act to correct both axial and lateral chromatic aberration.

An advantage of the present invention is that the invention enables large magnification ranges in a compact volume with near diffraction limited image quality. Also, the present invention provides a higher magnification for a narrower field of view than current system packages, while permitting a very low magnification mode of operation for a wide field of view, as well as an intermediate field of view without the need to reposition the eyepiece lens group.

This optical system may be provided to fit into current systems to increase the high end magnification capabilities without substantial redesign for packaging purposes. Also, the present invention provides a forward looking infrared telescope which enables three coaxial forward looking infrared fields of view.

While it will be apparent that the preferred embodiment is well calculated to fill the above stated objectives, it will also be appreciated that the present invention is susceptible to modification, variation, alteration, and change without varying from the proper scope and fair meaning of the subjoined claims.

What is claimed is:

1. An infrared refractive reimaging afocal telescope comprising:
   an objective lens group for receiving and focusing collimated radiation of a viewed object;
   an eyepiece lens group receiving radiation from said objective lens group said eyepiece lens group recollimating and forming an exit pupil;
   said objective lens group and said eyepiece lens group providing a first magnification and field of view; and
   a switch lens group selectively positioned with respect to said objective lens group to receive and transmit said radiation for changing magnification of the telescope and providing two additional fields of view, and at least one optical element of said switch lens group having an optical diffractive surface for correcting chromatic aberration.

2. The telescope according to claim 1 wherein at least one lens in said eyepiece lens group includes a diffractive surface for correcting chromatic aberration.

3. The telescope according to claim 1 wherein said switch lens group includes four lenses grouped in first and second pairs with the first pair of said lenses positionable between said objective lens group and said eyepiece lens group to provide a second magnification and field of view and the second pair of lenses positionable between said objective lens group and said eyepiece lens group to provide a third magnification and field of view.

4. The telescope according to claim 3 wherein said first pair of lenses has one diffractive surface and said second pair of lenses has two diffractive surfaces.

5. An infrared refractive reimaging afocal telescope comprising:
   a pair of objective lenses for receiving and focusing collimated radiation in the thermal infrared band of a viewed object;
   switching lens group positioned between said pair of objective lenses to selectively receive and transmit radiation from one of said objective lenses for changing magnification of the telescope and providing three fields of view, at least one lens of said switch lens group having a diffractive surface for correcting chromatic aberration; and
   an eyepiece lens pair receiving energy from said objective lens pair recollimating the radiation and forming an exit pupil, and one of said eyepiece lenses including a diffractive surface for correcting chromatic aberration.

6. The telescope according to claim 5 wherein said switch lens group includes four lenses grouped in pairs with a first pair of said lenses positioned to receive and transmit radiation to provide a desired magnification and field of view and a second pair of lenses positioned to receive and transmit radiation to provide another desired magnification and field of view.

7. The telescope according to claim 6 wherein said first pair of lenses has one diffractive surface and said second pair of lenses has two diffractive surfaces.

8. The telescope according to claim 5 further comprising a plurality of fold mirrors for compacting the telescope.

9. An infrared refractive reimaging afocal telescope comprising:
   an objective lens group for receiving and focusing collimated radiation of a viewed object;
   an eyepiece lens group receiving radiation from said objective lens group said eyepiece lens group recollimating and forming an exit pupil;
   said objective lens group and said eyepiece lens group providing a first magnification and field of view; and
   a switch lens group selectively positioned with respect to said objective lens group to receive and transmit said radiation for changing magnification of the telescope and providing two additional fields of view.

* * * * *